United States Patent [19]
Akiyama et al.

[11] Patent Number: 4,666,519
[45] Date of Patent: May 19, 1987

[54] AQUEOUS INK COMPOSITION

[75] Inventors: Kazutoshi Akiyama, Matsubara; Takashi Ono, Takatsuki; Tatsuya Yagyu, Neyagawa, all of Japan

[73] Assignee: Orient Chemical Industries, Ltd., Osaka, Japan

[21] Appl. No.: 749,086

[22] Filed: Jun. 26, 1985

[30] Foreign Application Priority Data

Jun. 29, 1984 [JP] Japan ................................. 59-135848
Mar. 4, 1985 [JP] Japan ................................... 60-43214

[51] Int. Cl.$^4$ ............................................. C09D 11/00
[52] U.S. Cl. ........................................ 106/22; 106/20
[58] Field of Search ..................................... 106/20, 22

[56] References Cited

U.S. PATENT DOCUMENTS 3,044,843  7/1962  Tullio ..................................... 8/918
3,764,309 10/1973  Tamai et al. .......................... 430/97
4,195,104  3/1980  Fell ...................................... 427/287

OTHER PUBLICATIONS

Derwent Abstract Accession Number 78-82712A/46, Japanese Pat. No. J53115306-A, Oct. 7, 1978.

Primary Examiner—Amelia B. Yarbrough
Attorney, Agent, or Firm—Birch, Stewart, Kolasch and Birch

[57] ABSTRACT

The present invention provides an aqueous ink composition having water-resistance in written trace or printed image on or after writing down and having good solution stability; which comprises as a coloring agent a reaction mixture of a dye, an epoxy compound and optionally an amine compound.

18 Claims, No Drawings

AQUEOUS INK COMPOSITION

FIELD OF THE INVENTION

The present invention relates to an aqueous ink composition, more particularly, an aqueous composition suitable for writing utensils, printing, recording or stamping.

BACKGROUND OF THE INVENTION

There have been known aqueous inks containing various kinds of water soluble dyes. These aqueous inks have excellent solution stability, but have poor water-resistance in a written trade or printed image. However, aqueous inks having excellent water-resistance on and after writing down are very few.

In order to overcome the above defect in aqueous inks, various improvements have been proposed, for example, Japanese Pat. Publn. (unexamined) Nos. 31526/1976, 115306/1978, 116762/1981, 131678/1981, 10685/1982, 30772/1982, 102972/1982, 198768/1982, 202359/1982, 1764/1983 and Japanese Pat. Publn. (examined) No. 6581/1965.

Among them, use of direct dyes was proposed. The direct dyes, however, do not provide sufficient water-resistance and do not have sufficient solubility in low pH range. In a high pH range, physical properties of ink are adversely affected for the reason that acetate fiber which is usually used as ink storage material is hydrolyzed to release the decomposed materials to the ink. Also the direct dyes do not have good color tone other than black, but the black has possibility of increasing the viscosity of the ink or to gel it.

An ink wherein an oil-soluble dye is dissolved in an aromatic solvent provides sufficient water resistance, but it blots on a paper and smells because of the organic solvent. Also an ink containing a spirit-soluble dye, such as an ink wherein an amine salt of the spirit-soluble dye is dissolved in an alcoholic solvent, has poor water-resistance in comparison with the ink using the oil-soluble dye.

Also an emulsion or dispersion ink containing an water-insoluble dye or water-insoluble pigment was proposed. It has, however, insufficient storage stability and may cause a plugging of a capillary passage of the storage material.

There exists an ink which makes a written trace water insoluble as time goes on in terms of a reaction of the ink with light or oxygen in the air. It requires however, a considerable time for obtaining sufficient water-resistance and may change its color.

Furthermore, it was also proposed that an ink be prepared by adding an aditive (which may include a polymer material) to the water-soluble dye, thus increasing the water-resistance of the ink. This ink is not expected to exhibit excellent water-resistance on or after writing down. This ink is not stable to a pH change so that the ink solution has to be kept in a narrow pH range. The additive ink having higher water resistance has worse solution stability.

SUMMARY OF THE INVENTION

The present invention provides an ink composition having excellent water-resistance in a written trace or printed image on and after writing down, which comprises as a coloring agent a reaction mixture of the following components:

(a) a water-soluble dye having an active hydrogen,
(b) an epxoy compound represented by the general formula:

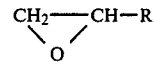

wherein R represent an alkyl group having 1 to 4 carbon atoms, or $CH_2OR_1$ and $R_1$ represents hydrogen, an alkyl group group having $C_1$ to $C_5$, an alkenyl groups having $C_1$-$C_5$, (meth)acryl acid group, propyltrimethoxysilane or a polyhydric alcohol moiety having molecular weight of not more than 300, and (c) optionally an amine compound except an alkanolamine.

The ink composition according to the present invention has excellent solution stability as time goes on, the water-resistance of written trace and the light-resistance of written trace.

DETAILED DESCRIPTION OF THE INVENTION

It is believed that the reason why the ink composition of the present invention improves the water-resistance of written trace is that a coloring agent similar to a polymer dye having an OH group is produced by reacting the water-soluble dye with the epoxy compound, thus the obtained composition improves solution stability, light-resistance and affinity with paper. It is also believed that the amine moiety lowers water-solubility by a sulfonic moiety etc. which imparts water-solubility to the dyes and also the amine moiety improves affinity with paper.

The water-soluble dyes (a) having an active hydrogen used in the present invention are direct dyes, acidic dyes, basic dyes, and the like, which have —NH, —NH$_2$, —COOH, —SO$_2$NH$_2$, —OH, and the like in the chemical structure. In the present ivention, every type of the dyes can be used, thus red type dyes by which little water-resistance has been imparted to the ink can also be employed.

The epoxy compound employed in the present invention has the following formula:

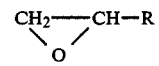

wherein R represents an alkyl group having 1 to 4 carbon atoms, or —CH$_2$OR$_1$ and R$_1$ represents hydrogen, an alkyl group alkenyl group having C$_1$ to C$_5$, an alkenyl group having C$_1$ to C$_5$, (meth)acryl acid group, propyltrimethoxysilane or a polyhydric alcohol moiety having molecular weight of not more than 300.

Examples of epoxy compounds may be monoepoxides or polyepoxides. Preferred epoxies are monoepoxides or diepoxides.

Examples of monoepoxides are ethylene oxide, propylene oxide, 1,2-butylene oxide, 1,2-pentan oxide, glycidol, methyl glycidyl ether, butyl glycidyl ether, allyl glycidyl ether, glycidyl methacrylate, γ-glycidoxypropyltrimethoxysilane and the like.

Examples of diepoxides are glycidyl ethers of polyhydric alcohol having molecular weight of not more than 300, such as ethylene glycol, diethylene glycol, polyethylene glycol, 1,2-propylene glycol, 1,4-butylene glycol, neopentyl glycol, 2,2'-dibromo-neopentyl glycol, 1,2,6-hexane triol, glycelol and the like.

The reaction of the dye with the epoxide can be conducted by a conventional process. For example, the reaction may be conducted in a solvent in the presence or absence of a catalyst such as an acid or an alkali at room temperature or elevated temperature. When epoxides having lower boiling point, such as ethylene oxide or propylene oxide, is used, the reaction may be conducted in an autoclave.

After reacting, the obtained reaction mixture per se can be used for the coloring agent of the present invention. The reaction product may be obtained as powder by isolating and purifying, it should be understood that this powder product is also included in the scope of the present invention.

In the reaction process, the dye may be used in the form of free acid which is a form the dye originally possesses. Also the dye may be used in the form of a partial alkali salt formed from a reaction with an adequate amount of alkali. Examples of the alkali sources are sodium hydroxide, potassium hydroxide, lithium hydroxide, ammonia water and alkanolamines, such as ethanolamine.

More than two types of the epoxide may be reacted with one type of the dye. Inversely, diepoxides may be reacted with not less than two types of the dye to obtain a medium color between the dyes.

Usually the reaction product prepared from the above process has the formula:

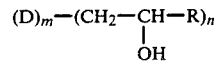

wherein D represents a dye moiety, R represents an alkyl group having 1 to 4 carbon atoms, or —CH$_2$OR$_1$ (R$_1$ represents hydrogen, an alkyl group having C$_1$ to C$_5$, an alkenyl group having C$_1$-C$_5$, (meth)acryl acid group, propyltrimethoxysilane or a polyhydric alcohol moiety having molecular weight of not more than 300), m represents 1 or 2, and n is an integer of 1–4.

However, according to the above reaction process, the obtained reaction product, for example, when the dyes have plural groups containing an active hydrogen, may be a reaction mixture containing various type of reaction products. Even if the reaction condition varies, the obtained coloring agent has similar properties with respect to color tone, water-resistance, security etc. insofar as the same reactants is employed. Representative examples of the reaction product is as follow:

[Compound examples]

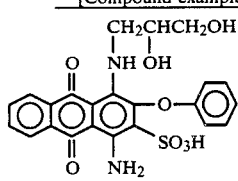
(1)

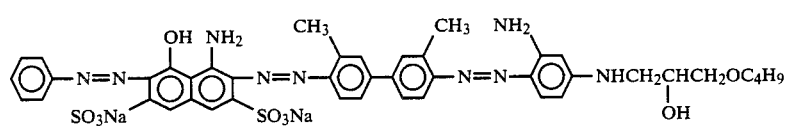
(2)

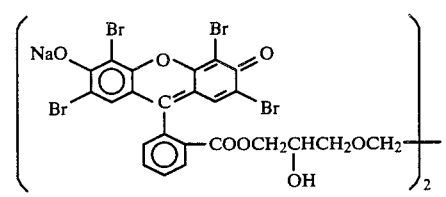
(3)

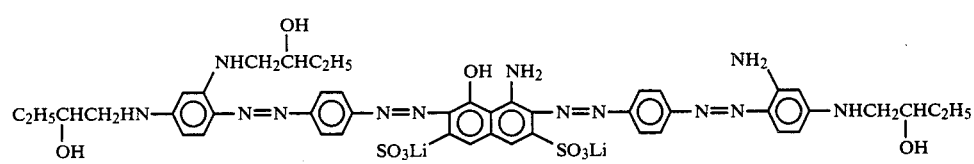
(4)

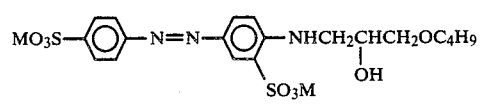
(5)

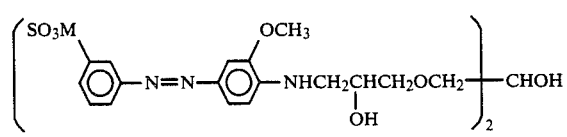
(6)

-continued
[Compound examples]
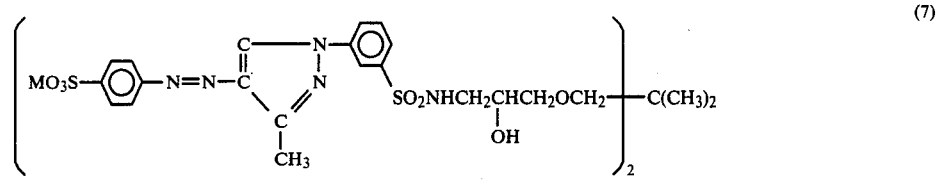
(7)
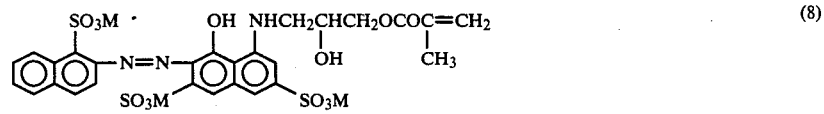
(8)
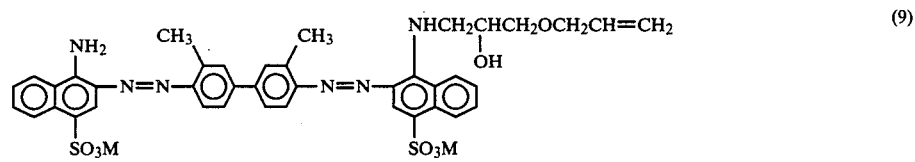
(9)
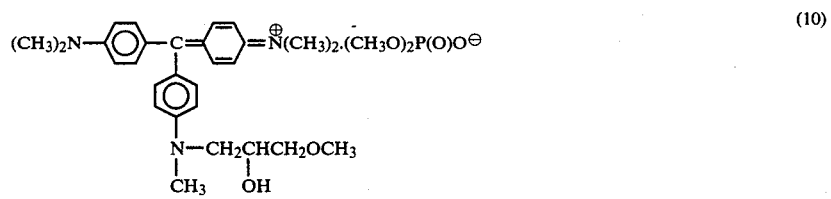
(10)
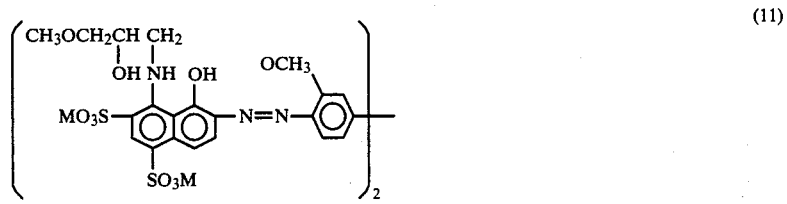
(11)
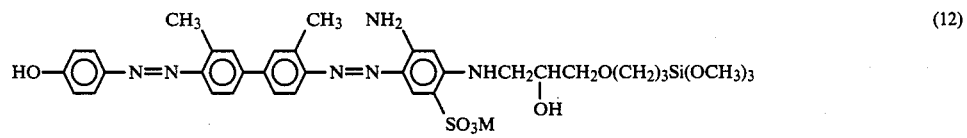
(12)
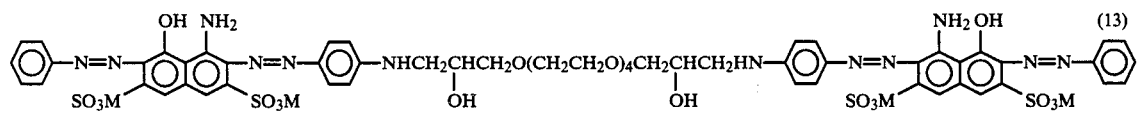
(13)
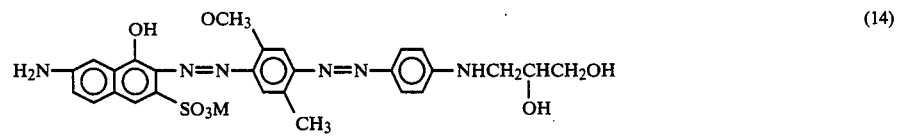
(14)
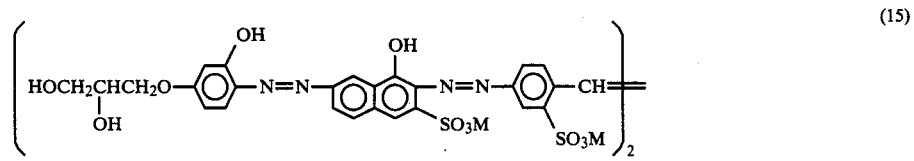
(15)
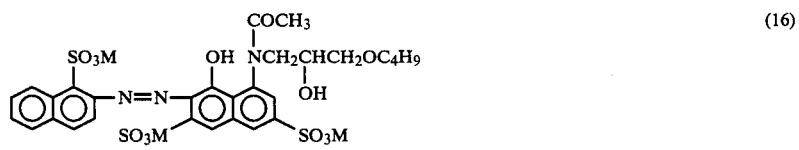
(16)

Besides the reaction products of the above two components, the ink composition may be obtained from the reaction mixture formed from a reaction of the dye, the epoxy compound and the amine component except an alkanolamine.

Examples of the amine compound(c) are aromatic amines, such as 1,3-diphenylguanidine, 1-o-tolylbiguanide, di-o-tolylguanidine and the like; alicyclid amines such as cyclohexylamine, dicyclohexylamine and the like; aliphatic amines such as 2-ethyl-hexylamine; and urea amines such as tetraethylurea, trimethylthiourea, N,N′-diphenylthiourea and the like.

When three components i.e. the dyes, the epoxides and the amine compounds, are used, three compounds are charged in a reaction vessel and reacted simultaneously and also two conpounds are reacted with each other followed by reacting with the other compound. In the latter case, the reaction process has the following three processes;

(I) The dyes (a) are reacted with the epoxides (b) followed by reacting with the amine compounds (c).

(II) The dyes (a) are reacted with the amine compounds (c) followed by reacting with the epoxides (b).

(III) The epoxides (b) are reacted with the amine compounds (c) followed by reacting with the dyes (a). Regardless of the procedure which has been used, the coloring agent obtained from the reaction mixture has similar properties with respect to color tone, water-resistance, security etc. insofar as the reactants are the same.

The reaction of the above components can be conducted at room temperature or at an elevated tempreratue in a solvent which can dissolve the three reactants, as described generally in the reaction process of two components, i.e. dyes and epoxides. For example, when the three components are reacted simultaneously, the three components are dissolved in a solvent, i.e. water or a water soluble organic solvent one by one followed by adding a catalyst and then heated to an elevated temperature.

Depending on the selected reactants or process to be used in the reaction, the obtained reaction mixture may turn include a mixture of unreacted material and reacted products. This type of reaction mixture containing unreacted materials should be understood to be included in the scope of the present invention. As mentioned hereinbefore, it is believed that this type of mixture can impart excellent water-resistance to the ink.

Representative reaction products are as follow:

[Examples]

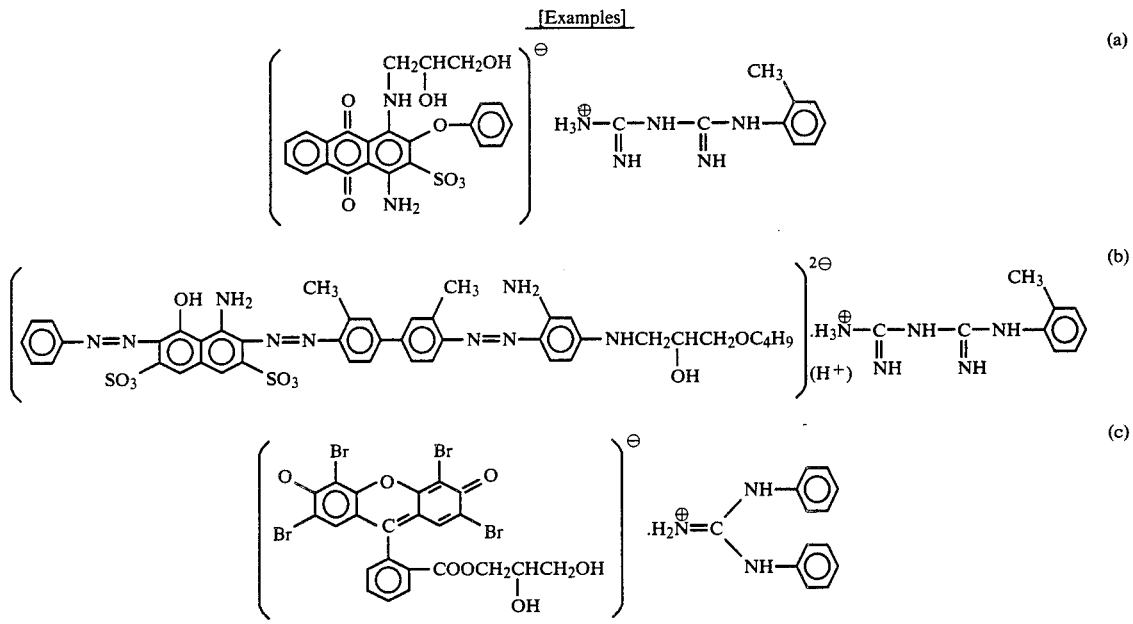

The reaction product may be formulated in a solvent in combination with an additive for the coloring agent to form the coloring agent.

When the coloring agent is used for an aqueous ink composition, the solvent includes generally water or a water-soluble organic solvent.

Preferred water-soluble organic solvents are those having a property compatible with water and dissolving the dye and the additive, and having hygroscopicity in an adequate degree which prevents evaporation of the ink. Examples of the solvents are glycol solvents, such as ethylene glycol, diethylene glycol, thiodiglycol; alcohol solvents; cellosolve solvents; carbitol solvents; pyrrolidone solvents; and alkanol amines. Depending on properties of the solvent, the solvent may contain a little amount of water (up to 10% by weight) or a cosolvent such as acetone, xylene, ethyl acetate and the like. Above all, an ink having a good feeling in writing can be obtained by using benzyl alcohol and/or phenyl glycol.

The additives include pH adjusters, anionic-, cationic- or nonionic-surfactants, preservatives, and rust preventive or sequestering agents. Also a natural or synthetic water soluble resin, or natural or synthetic alcohol-soluble resin, can be optionally formulated.

The amount of the additives and of from 0.1 to 5% by weight based on the total amount of the aqueous ink composition.

The ink composition of the present invention is formed by mixing the above components, i.e. the coloring agent, and the additive and then optionally filtrating.

The ink composition of the present invention has excellent solution stability as time goes on and extends the pH range for stable dissolubility, thus making it possible to prepare an aqueous ink having a neutral pH range. The ink composition of the present invention also prevents corrosion and plugging of a capillary passageway effectively and imparts excellent water-resistance to written trace or printed image.

The aqueous ink composition of the present invention is suitable for a writing utensil, printing, record or stamp.

The present invention is illustrated by the following examples, which, however are not construed as limiting the present invention. In the examples, all parts and percentage are by weight unless otherwise specified.

EXAMPLE

Preparation Example 1

Synthesis of Compound Example 1

One hundred fifty parts of water and 7.5 parts (0.1 mol) of glycidol were charged in a four-necked 500 ml flask equipped with a stirrer, a thermometer and a condenser and 41 parts (0.1 mol) of C.T. Acid Violet 41 was added and mixed for 30 minutes. To the resultant mixture, 5 parts of caustic potash was added and then heated. Mixing was held at a temperature of 95° to 100° C. until the reaction was terminated. After filtrating the reaction mixture, the filtrate was poured and dispersed in 500 parts of sufuric acid solution containing 15 parts of sulfuric acid. The precipitated crystal was filtrated and rinsed by 50 parts of one (1) % sulfuric acid solution and 50 parts of water. The wet crystal was dried to form 32 parts of a coloring agent mainly comprising the resultant compound.

Preparation Example 2

Synthesis of Compound Example 2

One hundred fifty parts of water and 13 parts (0.1 mol) of butyl glycidyl ether were charged in a reaction vessel as described in Preparation Example 1 and 77 parts (0.1 mol) of free acid type C.I. Direct Black 154 was added. After dispersing the mixture, 20 parts of diethanolamine was added and heated slowly. Mixing was maintained at a temperature of 80° to 85° C. until the reaction was terminated.

After salting-out the reaction mixture, the precipitated material was filtrated, dried and then purified by using a solvent according to a usual process. 76.1 parts of a coloring agent was obtained (yield: 80%).

Preparation Example 3

Synthesis of Compound Example 3

One hundred fifty parts of water and 9 parts (0.05 mol) of ethylene glycol diglycidyl ether were charged in a reaction vessel as described in Preparation Example 1 and 70 parts (0.1 mol) of free acid type C.I. Acid Red 87 was added. After dispersing the mixture at room temperature for 30 minutes, 25 parts of triethanolamine was added to heat slowly. Mixing was maintained at a temperature of 88° to 90° C. until the reaction was terminated.

After terminating the reaction, 100 parts of hot water was added to the resultant mixture and adjusted to the pH to 8 to 9 with a 10% caustic soda solution. After filtrating, water was added to the product to obtain 360 parts of a coloring agent, which is corresponding to 20% solution of C.I. Acid Red 87.

Preparation Example 4

Synthesis of Compound Example 4

One hundred parts of water and 70 parts of N-methylpyrrolidone were charged in a reaction vessel as described in Preparation Example 1 and 80 parts (0.1 mol) of free acid type C.I. Direct Black 19 was added to the reaction vessel. After dispersing the mixture, 21.6 parts (0.1 mol) of 1,2-butylene oxide was added dropwise over 60 minutes at a temperature of 45° to 50° C., at which the mixture was maintained for 60 minutes and then heated slowly to 80° C. Further the reaction mixture was kept mixing at a temperature of 80° to 85° C. until the reaction was terminated. After finishing the reaction, 100 parts of hot water was added and adjusted the pH to 8 to 9 with a 10% lithium hydroxide solution. On filtrating the mixture, water was added to form 405 parts of coloring agent, which is corresponding to 20% solution of C.I. Direct Black 19.

EXAMPLE 1

Forty parts of distilled water was added to 5.9 parts of the free acid type coloring agent produced in Preparation Example 1 to adjust to pH 8 to 9 with a 10% caustic sode solution. Ten parts of ethylene glycol, 10 parts of diethylene glycol, 5 parts of propylene glycol, 0.3 parts of preservative and 0.2 parts of surfactant were added to the resultant mixture and, by adding distilled water, the mixture was made to 100 parts. The obtained mixture was dissolved at 60° to 70° C. and then filtrated with an industrial filter, thus forming a violet ink.

The obtained ink was charged in a felt tip pen container to be subjected to a writing test in which no scratch of ink occured at the head point of felt tip and flop of ink was smooth, and the written trace by using the pen exhibited good color tube. At 30 minutes after writing down, a water-resistance test was conducted by immersing the written trace into distilled water. The result gave good water-resistance. Also the obtained ink was stable after standing for more than 6 months at room temperature.

EXAMPLE 2

| Ingredients | Parts by weight |
| --- | --- |
| Coloring agent obtained in Preparation Example 2 | 10 |
| Ethylene glycol | 10 |
| Diethylene glycol | 10 |
| Thiodiglycol | 5 |
| Trimethanolamine | 2 |
| Preservative | 0.3 |
| Surfactant | 0.2 |
| Distilled water | 62.5 |

The above ingredients were dissolved at 60° to 70° C. and filtrated with an industrial filter to obtain a black ink.

The resultant ink composition was charged in a felt tip pen container and subjected to the tests as described in Example 1, which indicated good results.

EXAMPLE 3

| Ingredients | Parts by weight |
| --- | --- |
| Concentrated solution of the coloring agent obtained in Preparation Example 3 | 40 |
| Ethylene glycol | 10 |

-continued

| Ingredients | Parts by weight |
| --- | --- |
| Diethylene glycol | 10 |
| N—metylpyrrolidone | 2 |
| Preservative | 0.3 |
| Surfactant | 0.2 |
| Distilled water | 34.8 |

The above ingredients were treated as described generally in Example 2 to obtain a red ink.

The resultant ink composition was charged in a felt tip pen container and subjected to the tests as described in Example 1, which indicated good results.

EXAMPLES 4 TO 9

By using the coloring agent containing compound examples 1 to 16 described in the Detailed Description of the Invention in an amount corresponding to 5 parts of the dye which have not been reacted with the epoxide, 20 parts of ethylene glycol and distilled water, 100 parts of inks were obtained.

The inks were charged in felt tip pen container and continuously written down by a writing test machine. The written trace on paper was immersed in distilled water for 24 hours after 30 minutes from initially writing down, taken out and dried by air, thus evaluating the written trace. The results are shown in Table 1. In this case, coloring agents containing the compound as shown by compound examples 5 to 16 were prepared by Preparation Examples 1 and 2.

Comparative Examples 1 to 16

By using 5 parts of the dye which has not been reacted with the epoxide corresponding to compound examples 1 to 16, 20 parts of ethylene glycol and distilled water, 100 parts of inks were obtained.

The inks were charged in felt tip pen container and subjected to the water-resistance test as described generally in Examples 4 to 19. The results are shown in Table 1.

TABLE 1

| Examples | | | | | Comparative example | | |
| --- | --- | --- | --- | --- | --- | --- | --- |
| No. | Compound example No. | (M) | water-resist-ance | Solution stabil-ity | No. | water-resist-ance | Solution stabil-ity |
| 4 | 1 | Na | 5 | ○ | 1 | 1 | X |
| 5 | 2 | Na | 5 | ◎ | 2 | 1 | △ |
| 6 | 3 | Na | 4 | ◎ | 3 | 0 | ◎ |
| 7 | 4 | Li | 5 | ◎ | 4 | 2 | X |
| 8 | 5 | Na | 3 | ◎ | 5 | 0 | ○ |
| 9 | 6 | Na | 5 | ◎ | 6 | 1 | ○ |
| 10 | 7 | Na | 3 | ◎ | 7 | 0 | ○ |
| 11 | 8 | K | 3 | ◎ | 8 | 0 | ○ |
| 12 | 9 | Na | 5 | ○ | 9 | 1 | X |
| 13 | 10 | — | 5 | ◎ | 10 | 2 | ○ |
| 14 | 11 | K | 5 | ◎ | 11 | 0 | ○ |
| 15 | 12 | Na | 5 | ○ | 12 | 1 | X |
| 16 | 13 | NH₄ | 4 | ◎ | 13 | 1 | ○ |
| 17 | 14 | Li | 5 | ◎ | 14 | 1 | X |
| 18 | 15 | Na | 5 | ○ | 15 | 1 | ○ |
| 19 | 16 | Na | 5 | ◎ | 16 | 0 | ○ |

Evaluation for water-resistance

5: The original written trace on paper remains in the range of 100 to 9% after immersing in water.

4: The original written trace on paper remains in the range of 90 to 70% after immersing in water.

3: The original written trace on paper remains in the range of 70 to 50% after immersing in water.

2: The original written trace on paper remains in an amount of 50 to 30% after immersing in water.

1: The original written trace on paper remains in an amount of 30 to 10% after immersing in water.

0: The original written trace on paper remains in an amount of 10 to 0% after immersing in water.

Evaluation of stability

Solution stability in case that the inks stands for 2 months at 50° C.

◎ : excellent
○ : good
△: fairly good
X: bad

EXAMPLE 20

| Ingredients | Parts by weight |
| --- | --- |
| Coloring agent containing compound example 6 | 3 |
| Diethylene glycol | 11 |
| Preservative | 0.2 |
| Distilled water | 85.8 |

The above ingredients were mixed completed and filtrated and purified with a membrane filter having the pore size of 0.8 micron to obtain a yellow ink for jet print.

Obtained ink had excellent solution stability and did not occur a plugging and the printed document exhibited clear yellow.

EXAMPLE 21

| Ingredients | Parts by weight |
| --- | --- |
| Coloring agent containing compound example 15 | 5 |
| Triethylene glycol | 10 |
| Thiodiglycol | 2 |
| N—Methylpyrrolidone | 1 |
| Preservative | 0.2 |
| Distilled water | 81.8 |

The above ingredients were treated as described generally in Example 20 to obtain a black ink for jet print. The obtained ink had excellent solution stability and the printed document showed good water resistance.

EXAMPLE 22

| Ingredients | Parts by weight |
| --- | --- |
| Coloring agent containing compound example 11 | 8 |
| Glycerine | 70 |
| Arabia gum | 5 |
| Distilled water | 17 |

The above ingredients were dissolved at 60° to 70° C. and filtrated and purified with a membrane filter to obtain a blue ink for stamp.

The obtained ink had excellent solution stability and the stamped document exhibited excellent water-solubility.

The following examples indicated of coloring agents prepared by using three components, i.e. the dye, the epoxy compound and the amine compounds.

Preparation Example I

Synthesis of Compound Example I

One hundred fifty parts of water and 7.5 parts (0.1 mol) of glycidol were charged in a reaction vessel as described in Preparation Example 1 and 41 parts (0.1 mol) of C.I. Acid Violet 41 was added and mixed for 30 minutes. To the resultant mixture, 10 parts of a 50% caustic potash was added and then heated. Mixing was at a temperature of 95° to 100° C. until the reaction was terminated. After filtrating the reaction mixture, the filtrate was poured and dispersed into 500 parts of sulfuric acid solution containing 15 parts of sulfuric acid. The precipitated crystal was filtrated and rinsed by 50 parts of one % sulfuric acid solution and 50 parts of water to obtain 32.5 parts of glycidol added Acid Violet.

Twenty five gram (0.05 mol) of the glycidol added Acid Violet in a 500 ml beaker, to which 200 parts of water containing 5 parts of sodium hydroxide was added, was dissolved at 70° to 80° C. and then cooled to 40° C. To the obtained mixture, a solution mixing 100 parts of water containing 5 parts of hydrochloric acid with 10 parts (0.05 mol) of 1-o-tolylbiguanidine was added dropwise. After adjusting the pH of the resultant solution, it was heated to 40° C. and filtrated and rinsed by 100 parts of water, then dried.

35 parts of a coloring agent was obtained.

Preparation Example II

Synthesis of Compound Example II

One hundred fifty parts of water and 13 parts (0.1 mol) of butyl glycidyl ether were charged in a vessel as described in Preparation Example 1 and 77 parts (0.1 mol) of C.I. Direct Black 154 was added and dispersed completely. To the resultant mixture, 20 parts of diethanol amine was added and then heated slowly. Mixing was held at a temperature of 95° to 100° C. until the reaction was terminated. After finishing the reaction, the reaction mixture was left, cooling to room temperature.

To the reaction mixture, a solution mixing 100 parts of water containing 5 parts of hydrochloric acid and 10 parts (0.05 mol) of 1-o-tolylbiguanide was added dropwise. The resultant solution was adjusted to pH 3 and heated to 40° C. to precipitate. After filtrating the precitation, it was rinsed by water and dried. The yield was 80%.

Preparation Example III

Synthesis of Compound Example III

One hundred fifty parts of water and 7.5 parts (0.1 mol) of glycidol were charged in a vessel as described in Preparation Example 1 and 70 parts (0.1 mol) of C.I. Acid Red 87 was added and mixed for 30 minutes. To the resultant mixture, 25 parts of triethanolamine was added and then heated. Mixing was held at a temperature of 85° to 90° C. until the reaction was terminated. After finishing the reaction, 90 parts of hot water and 10.6 part (0.05 mol) of 1,3-diphenylguanidine were added and mixed to obtain an uniform solution, to which a 10% sodium hydroxide solution was added to adjust to the pH range of 8 to 9. After filtrating the solution, water was added to form 360 parts of a concentrated solution of coloring agent corresponding to a 20% coloring agent solution of C.I. Acid Red 87.

Preparation Example IV

Synthesis of Compound Example IV

One thousand parts of water and 200 parts of C.I. Acid Yellow 9 were added to a reaction vessel of Preparation Example 1 and mixed completely at 70° C., then cooled. To the obtained mixture, a solution mixing 500 parts of water containing 90 parts of sulfuric acid with 106 parts of 1,3-diphenylguanidine was added dropwise at less than 30° C., and then adjusted the pH to 3 and heated to 40° C. to precipitate. After filtrating the solution and drying the precipitation, a diphenylguanidine added C.I. Acid Yellow 9 was obtained.

One hundred fifty parts of water and 8.7 parts (0.1 mol) of methyl glycidol were charged in a reaction vessel as described in Preparation Example 1 and 56.6 parts (0.1 mol) of the diphenylguanidine added C.I. Acid Yellow 9 was added and mixed for 30 minutes. To the resultant mixture, 5 parts of a 50% caustic soda was added and then heated. Mixing was held at a temperature of 95° to 100° C. until the reaction was terminated.

The obtained mixture was poured and dispersed into 500 parts of a sulfuric acid solution containing 15 parts of sulfuric acid to precipitate. After filtrating the mixture, the filtrated precipitate was rinsed by 100 parts of one % sulfuric acid solution and 100 parts of water and then dried. The amount of the obtained coloring agent was 60 parts.

When the resultant coloring agent is subjected to an analysis by a high speed liquid chromatography[1], the results were as follows. The coloring agent of the present invention contains inter-reaction products of the following four compounds.

| | |
|---|---|
| The additive of C.I. Acid Yellow 9 with methyl glycidyl ehters | ca. 35% |
| C.I. Acid Yellow 9 | ca. 30% |
| The additive of diphenylguanidine with methyl glcidyl ether | ca. 20% |
| Diphenylguanidine | ca. 15% |

[1] Condition for the high speed liquid chromatography:
Machine: 6000A ABS-440 Type available from Waters Company
Column: RP-18 7 micron
Carrier: Acetonitril-water
Detector: Abs-254

Preparation Example V

Synthesis of Compound Example V

One hundred fifty parts of water and 6 parts (0.05 mol) of trimethylthiourea were charged in a reaction vessel as described in Preparation Example 1 and 56 parts (0.1 mol) of a free acid type C.I. Direct Black 90 was added and mixed completely. To the resultant mixture, 8.7 parts (0.05 mol) of ethylene glycol diglycidyl ether was added and dispersed and diethanolamine was added and heated slowly. Mixing was held at a temperature of 80° to 85° C. until the reaction was terminated.

After finishing the reaction, 100 parts of water was added to the resultant mixture and adjusted the pH to 10 to 10.5 with a 10% sodium hydroxide solution. After filtrating, water was added to obtaing 280 parts of the reaction mixture.

The obtained solution was a concentrated solution of coloring agent corresponding to 20% solution of C.I. Direct Black.

Preparation Example VI

Synthesis of Compound Example VI

One hundred fifty parts of n-propyl alcohol and 19.9 parts (0.2 mol) of cyclohexylamine were charged in a reaction vessel as described in Preparation Example 1 and 83.2 parts (0.1 mol) of free acid type C.I. Acid Blue 90 was added and mixed completely. To the resultant mixture, 13 parts (0.1 mol) of butyl glycidyl ether was added and mixed completely, and 20 parts of diethanolamine was added and then heated. Mixing was held at a temperature of 95° to 100° C. until the reaction was terminated.

After finishing the reaction, n-propyl alcohol was added to the reaction mixture to adjust the pH to 7 to 8 and then filtrated to obtain 417 parts of the reaction mixture by adding n-propyl alcohol.

The resultant solution was a concentrated solution of coloring agent corresponding to 20% solution of C.I. Acid Blue 90.

Preparation of Examples VII to XIII

Coloring agents were obtained as generally described in Preparation Examples I to VI except that dyes, epoxided and amine compound as indicated in Table 2 were employed. Reaction conditions etc. are shown in Table 2.

TABLE 2

| Compound | Name of dye | mol | Epoxy Compound | mol | Amine Compound | mol | Preparation process (1) | Obtained coloring agent |
|---|---|---|---|---|---|---|---|---|
| VII | C.I. Direct Yellow 44 | 0.1 | Methyl glycidyl ether | 0.1 | Diphenylguanidine | 0.08 | II | Powder |
| VIII | C.I. Acid Orange 56 | 0.1 | Allyl glycidyl ether | 0.05 | Di-o-tolylguanidine | 0.08 | III | 15% concentrated solution |
| IX | C.I. Acid Red 73 | 0.1 | Propylene glycol diglycidyl ether | 0.05 | 2-Ethylhexylamine | 0.2 | IV | Powder |
| X | C.I. Acid Red 92 | 0.1 | Butyl glycidyl ether | 0.1 | 1-o-tolylbiguanide | 0.1 | III | 20% concentrated solution |
| XI | C.I. Acid Blue 9 | 0.1 | Glycerine-diglycidyl ether | 0.05 | Diethylurea | 0.05 | V | 20% concentrated solution |
| XII | C.I. Acid Black 2 | 0.1 | Glycidyl methacrylate | 0.1 | N,N'—diphenyltiourea | 0.1 | V | 20% concentrated solution |
| XIII | C.I. Acid Black 17 | 0.1 | Methyl glycidyl ether | 0.1 | Diphenylguanidine | 0.2 | I | Powder |

(1) Number of Preparation Examples.

EXAMPLE I

Forty parts of distilled water were added to 8 parts of the coloring agent produced in Preparation Example II to and adjusted to pH 8 to 9 with 10% lithium hydroxide solution. Ten parts of ethylene glycol, 10 parts of diethylene glycol, 5 parts of thiodiglycol, 0.3 parts of preservant and 0.2 parts of surfactant were added to the resultant mixture and 100 parts of the resultant mixture was obtained by adding distilled water. The obtained mixture was dissolved at 60° to 70° C. to filtrate with an industrial filter, thus forming a black ink.

The obtained ink was charged in a felt tip pen container and subjected to a writing test in which no scratch occurred at the head point of felt tip and flow of ink was smooth, and the written trace produced with the pen exhibited good color tone. After 30 minutes from writing down, a water-resistance test was conducted by immersing the written trace on paper into water. The result produced good water-resistance. Also the obtained ink was stable after standing for more than 6 months at room temperature.

EXAMPLE II

| Ingredients | Parts by weight |
|---|---|
| Coloring agent obtained in Preparation Example III | 4 |
| Ethylene glycol | 10 |
| Diethylene glycol | 10 |
| Propylene glycon | 5 |
| Trimethanolamine | 2 |
| Preservative | 0.3 |
| Surfactant | 0.2 |
| Distilled water | 34.5 |

The above ingredients were dissolved at 60° to 70° C. and filtrated with an industrial filter to obtain a red ink.

The resultant ink composition was charged in a felt tip pen container and subjected to the above test, which indicated good results.

EXAMPLE III

| Ingredients | Parts by weight |
|---|---|
| Coloring agent obtained in Preparation Example IV | 4 |
| Diethylene glycol | 10 |
| 2-Pyrrolidone | 10 |
| Diethanolamine | 4 |
| Preservative | 0.3 |
| Surfactant | 0.3 |
| Distilled water | 71.4 |

The above ingredients were dissolved at 60° to 70° C. and filtrated with an industrial filter to obtain a yellow ink.

EXAMPLE IV

| Ingredients | Parts by weight |
|---|---|
| Coloring agent obtained in Preparation Example I | 3 |
| Glycidol added C.I. Acid Violet 41 | 2 |
| Ethylene glycol | 10 |
| Diethylene glycol | 10 |
| N—Methylpyrrolidone | 5 |
| Trimethanolamine | 2 |
| Preservative | 0.3 |
| Surfactant | 0.2 |
| Distilled water | 67.5 |

The above ingredients were dissolved at 60° to 70° C. and filtrated with an industrial filter to obtain a violet ink.

EXAMPLE V

| Ingredients | Parts by weight |
|---|---|
| Coloring agent obtained in Preparation Example VIII | 40 |
| Diethylene glycol | 10 |
| Propylene glycol | 5 |
| Glycerine | 5 |
| Surfactant | 0.2 |
| Distilled water | 39.8 |

The above ingredients were dissolved at 60° to 70° C. and filtrated with an industrial filter to obtain orange ink.

EXAMPLE VI

| Ingredients | Parts by weight |
|---|---|
| Coloring agent obtained in Preparation Example XI | 25 |
| Glycerine | 10 |
| Ethylene glycol | 5 |
| Thimethylolpropane | 5 |
| Preservative | 0.5 |
| Surfactant | 0.1 |
| Distilled water | 54.4 |

The above ingredients were dissolved at 60° to 70° C. and filtrated with an industrial filter to obtain a blue ink.

EXAMPLE VII

| Ingredients | Parts by weight |
|---|---|
| n-Propyl alcohol solution of coloring agent obtained in Preparation Example VI | 30 |
| Ethanol | 40 |
| Methyl cellosolve | 20 |
| Tamanol[1] | 10 |

[1]Phenol resin commercially available from Arakawa Chemical Co. LTD.

The above ingredients were dissolved at 60° to 70° C. and filtrated with an industrial filter to obtain a blue ink.

EXAMPLE VIII

| Ingredients | Parts by weight |
|---|---|
| Coloring agent obtained in Preparation Example IX | 7 |
| Coloring agent obtained in Preparation Example VII | 1 |
| Ethanol | 40 |
| n-Propyl alcohol | 32 |
| Methyl cellosolve | 10 |
| Haron 110H[1] | 10 |

[1]Ketone resin commercially available from Huels Faserwerke.

The above ingredients were treated as generally described in Example VII to obtain a black alcoholic ink.

EXAMPLE IX

| Ingredients | Parts by weight |
|---|---|
| Coloring agent obtained in Preparation Example XIII | 9 |
| Coloring agent obtained in Preparation Example VII | 1 |
| Ethanol | 40 |
| n-Propyl alcohol | 20 |
| Methyl cellosolve | 20 |
| Sulfoamide resin | 10 |

The above ingredients were treated as generally described in Example VII to obtain a black alcoholic ink.

EXAMPLE X

| Ingredients | Parts by weight |
|---|---|
| Coloring agent obtained in Preparation Example V | 25 |
| Diethylene glycol | 5 |
| 2-Pyrrolidone | 5 |
| Trimethanolamine | 5 |
| Preservative | 0.2 |
| Distilled water | 59.8 |

The above ingredients were mixed completely and dissolved at 60° to 70° C., and filtrated with an industrial filter having the pore size of 0.8 micron to obtain a black ink for jet print.

EXAMPLE XI

| Ingredients | Parts by weight |
|---|---|
| Coloring agent obtained in Preparation Example X | 40 |
| Methyl cellosolve | 20 |
| Scoarol 900[1] | 10 |
| Lithium hydroxide | 4 |
| Distilled water | 34.5 |

[1]A surfactant commercially available from Kao Soap Co. LTP.

The above ingredients were dissolved at 70° to 80° C. and filtrated with an industrial filter to obtaine a pink ink. for OHP.

EXAMPLE 12

| Ingredients | Parts by weight |
|---|---|
| Coloring agent obtained in Preparation Example XII | 50 |
| Glycerine | 45 |
| Arabia gum | 5 |

The above ingredients were dissolved at 70° to 80° C. and filtrated with an industrial filter to obtain a black ink for stamp.

EXAMPLE XIII

| Ingredients | Parts by weight |
|---|---|
| Coloring agent obtained in Preparation Example I | 5 |
| Coloring agent obtained in Preparation Example II | 15 |
| Coloring agent obtained in Preparation Example IX | 5 |
| Phenyl glycol | 45 |
| Benzyl alcohol | 10 |
| Triethanolamine | 5 |
| Polyvinylpyrrolidone | 5 |
| Haron 110H (Keton resin) | 10 |

The above ingredients were dissolved at 80° to 90° C. and filtered with a precoat of diatomaceous earth to obtain a black ink for ball point pen.

Inks obtained from Example I to XIII were charged in felt tip pen container or ball point pen containers and then subjected to a writing test on paper of JIS P 3201. The written trace on paper was immersed in distilled water for 24 hours from initially writing down and taken out from water and dried to evaluate. The results are shown in Table 3.

Comparative Example I to VI and X to XII

Inks were prepared as generally described in corresponding Examples with the exception that sodium salts of dyes were used as the raw materials instead of coloring agents.

The same tests were conducted to these inks. The results are shown in Table 3.

Comparative Example VII to IX and XIII

Inks were prepared as generally described in corresponding Examples with the exception that diphenylguanidine salts of dyes were used as raw materials instead of coloring agents.

The same tests were conducted to these inks. The results are shown in Table 3.

TABLE 3

| Examples | | | Comparative Example | | |
|---|---|---|---|---|---|
| No. | Compound | water-resist-ance | Solution stabil-ity | No. | water-resist-ance | Solution stabil-ity |
| 1 | 2 | 5 | ◎ | 1 | 2 | Δ |
| 2 | 3 | 5 | ◎ | 2 | 0 | ◎ |
| 3 | 4 | 3 | ○ | 3 | 0 | ○ |
| 4 | 1 | 5 | Δ | 4 | 1 | X |
| 5 | 8 | 5 | ○ | 5 | 0 | ○ |
| 6 | 11 | 5 | ○ | 6 | 1 | ○ |
| 7 | 6 | 5 | ○ | 7 | 4 | ○ |
| 8 | 7 + 9 | 5 | ○ | 8 | 3 | ○ |
| 9 | 7 + 13 | 5 | ○ | 9 | 3 | Δ |
| 10 | 5 | 5 | Δ | 10 | 2 | X |
| 11 | 10 | 5 | ○ | 11 | 1 | ○ |
| 12 | 12 | 4 | ◎ | 12 | 0 | Δ |
| 13 | 1 + 2 + 9 | 5 | ○ | 13 | 4 | X |

Evaluation for water-resistance

5: The original written trace on paper remains in the range of 100 to 90% after immersing in water.

4: The original written trace on paper remains in the range of 90 to 70% after immersing in water.

3: The original written trace on paper remains in the range of 70 to 50% after immersing in water.

2: The original written trace on paper remains in the range of 50 to 30% after immersing in water.

1: The original written trace on paper remains in the range of 30 to 10% after immersing in water.

0: The original written trace on paper remains in the range of 10 to 0% after immersing in water.

Evaluation of stability

Solution stability in case that ink stands for 2 months at 50° C.

◎ : excellent
○ : good
Δ: fairly good
X: bad

What is claimed is:

1. A water resistant ink composition which comprises a coloring agent, prepared by reacting:
   (a) a water-soluble dye having an active hydrogen, and
   (b) an epoxy compound represented by the formula:

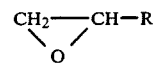

wherein R represents an alkyl group having 1 to 4 carbon atoms, or —CH$_2$OR$_1$ and R$_1$ represents hydrogen, an alkyl group having C$_1$ to C$_5$, an alkenyl group having C$_1$–C$_5$, (meth)acryl acid group, propyltrimethoxysilane or a polyhydric alcohol moiety having molecular weight of not more 300; wherein said coloring agent has substantially no unreacted epoxy groups.

2. The ink composition of claim 1, wherein said coloring agent has the formula:

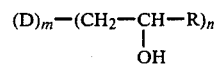

wherein
D represents a dye moiety, R represents an alkyl group having 1 to 4 carbon atoms, or —CH$_2$OR$_1$, and
R$_1$ represents hydrogen, an alkyl group having C$_1$ to C$_5$, an alkenyl group having C$_1$–C$_5$, (meth)acrylic acid group, propyltrimethoxysilane or a polyhydric alcohol moiety having molecular weight of not more than 300,
m represents 1 or 2, and
n is an integer of 1–4.

3. The ink composition of claim 1, further comprising reacting:
   (c) an amine compound with said coloring agent except for an alkanolamine.

4. The ink composition of claim 1, wherein said water-soluble dye (a) having said active hydrogen comprises direct dyes, acidic dyes or basic dyes which have —NH, —NH$_2$, —COOH, —SO$_2$NH$_2$, or —OH groups.

5. The ink composition of claim 1, wherein said epoxy compound (b) is a monoepoxide or a polyepoxide.

6. The ink composition of claim 5, wherein said epoxy compound (b) is a monoepoxide selected from at least one member of the group consisting of ethylene oxide, propylene oxide, 1,2-butylene oxide, 1,2-pentane oxide, glycidol, methyl glycidyl ether, butyl glycidyl ether, allyl glycidyl ether, glycidyl methacrylate and γ-glycidoxypropyl-trimethoxysilane, and said polyepoxide is a diepoxide selected from the group consisting of glycidyl ethers of polyhydric alcohol having molecular weight of not more than 300, including ethylene glycol, diethylene glycol, polyethylene glycol, 1,2-propylene glycol, 1,4-butylene glycol, neopentyl glycol, 2,2'-dibromo-neopentyl glycol, 1,2,6-hexane triol and glycelol.

7. The ink composition of claim 1, wherein said reaction is conducted in a solvent in the presence of an acid or an alkali catalyst at least at room temperature.

8. The ink composition of claim 1, further comprising isolating and purifying said coloring agent to form a powder.

9. The ink composition of claim 1, wherein said water soluble dye (a) is in the form of a free acid or in the form of a partial alkali salt.

10. The ink composition of claim 3, wherein said amine compound (c) is selected from at least one member of the group consisting of aromatic amines including 1,3-diphenylguanidine, 1-o-tolylbiguanide, and di-o-tolylguanidine; alicyclid amines including cyclohexylamine and dicyclohexylamine; aliphatic amines including 2-ethyl-hexylamine; and urea amines including tetraethylurea, trimethylthiourea and N,N'-diphenylthiourea.

11. The ink composition of claim 3, wherein the sequence of reacting components (a), (b), and (c) comprises the following three processes:

(I) reacting dye (a) with epoxy (b) followed by reacting with an amine compound (c);

(II) reacting dye (a) with amine compound (c) followed by reacting with an epoxy (b); or (III) reacting epoxy (b) with amine compound (c) followed by reacting with a dye (a).

12. The ink composition of claim 7, where said solvent comprises glycol solvents including ethylene glycol, diethylene glycol and thiodiglycol; alcohol solvents; cellosolve solvents; carbitol solvents; pyrrolidone solvents; or alkanol amines.

13. The ink composition of claim 1 having a neutral pH.

14. The ink composition of claim 1, wherein said coloring agent has one of the formulas:

[Compound examples]

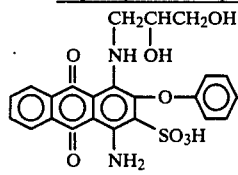
(1)

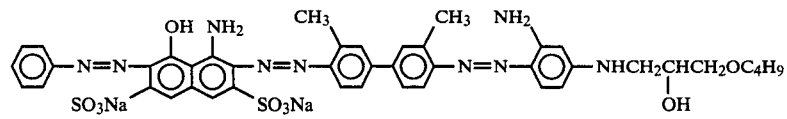
(2)

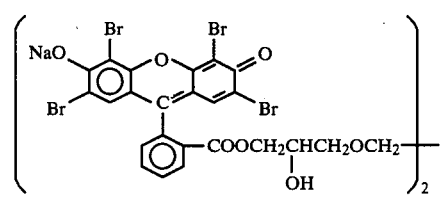
(3)

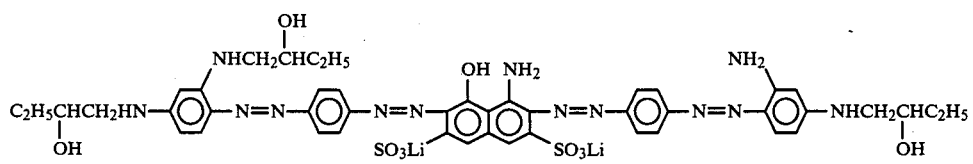
(4)

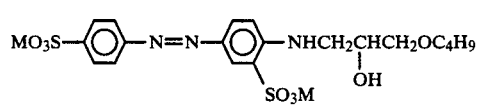
(5)

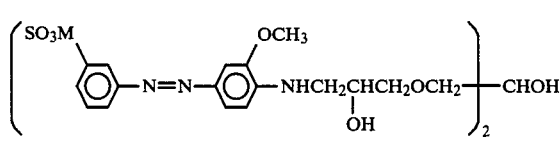
(6)

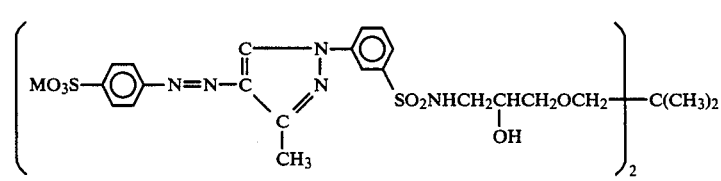
(7)

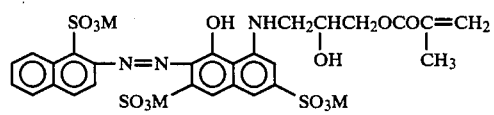
(8)

-continued
[Compound examples]

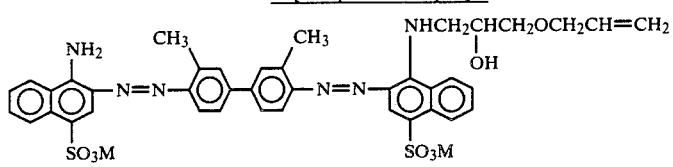 (9)

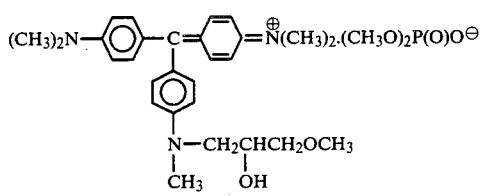 (10)

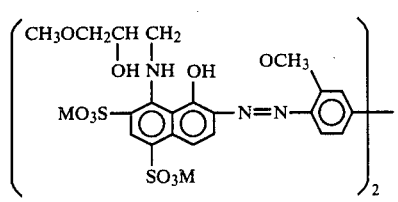 (11)

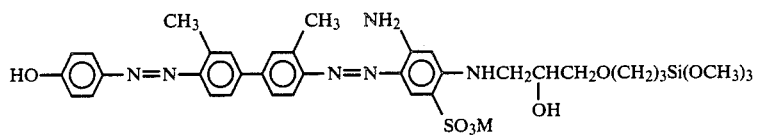 (12)

15. The ink composition of claim 3, wherein said coloring agent has one of the formulas:

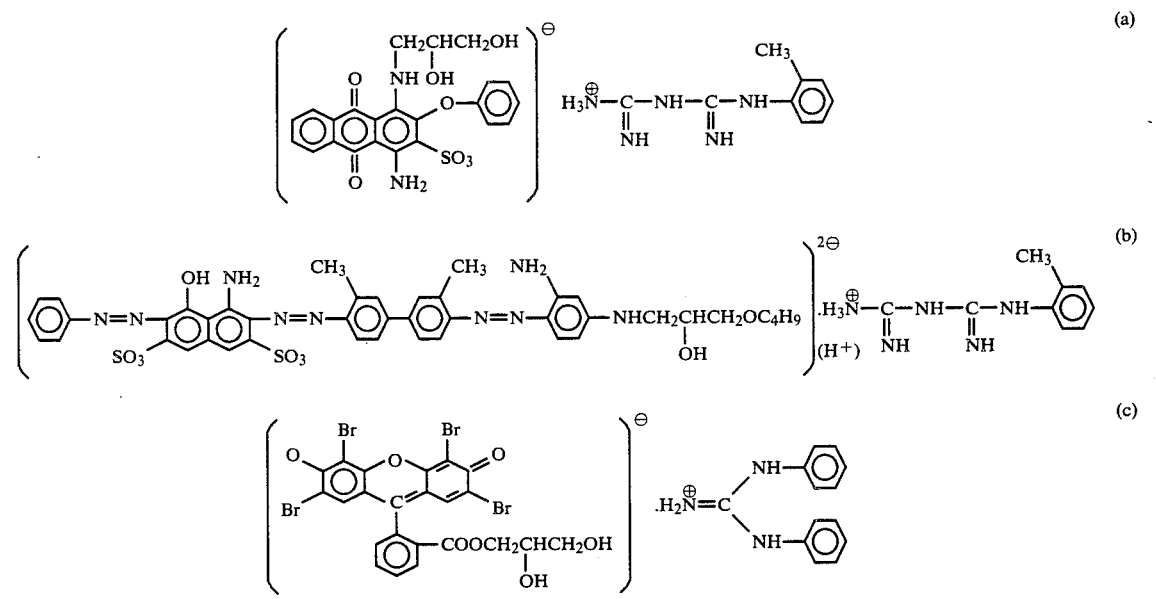

16. A water resistant ink composition which comprises a coloring agent prepared by reacting:
    (a) a water-soluble dye having an active hydrogen selected from at least one member of the group consisting of —NH, —NH$_2$, —COOH, —SO$_2$NH$_2$ and OH;
    (b) monoepoxides selected from at least one member of the group consisting of ethylene oxide, propylene oxide, 1,2-butylene oxide, 1,2-pentane oxide, glycidol, methyl glycidyl ether, butyl glycidyl ether, allyl glycidyl ether, glycidyl methacrylate and γ-glycidoxypropyl-trimethoxysilane or diepoxides selected from the group consisting of glycidyl ethers of polyhydric alcohol having molecular weight of not more than 300 including ethylene glycol, diethylene glycol, polyethylene glycol, 1,2-propylene glycol, 1,4-butylene gyciol, neopentyl glycol, 2,2'-dibromo-neopentyl gycol, 1,2,6-hexane triol and glycelol; and (c) optionally an amine compound selected from at least one member of the group consisting of amines including 1,3-diphenylguanidine, 1-o-tolylbiguanide, and di-o-tolylguanidine; alicyclid amines including cyclohexylamine and dicyclohexylamine; aliphatic amines including 2-ethyl-hexylamine; and urea amines including tetraethylurea, trimethylthiourea and N,N′-diphenylthiourea,
wherein said coloring agent has substantially no unreacted epoxy groups.

17. The ink composition of claim 1, wherein said reaction between (a) and (b) is substantially complete so that the coloring agent is effectively stable.

18. A water resistant ink composition comprising a reacted coloring agent of:

(a) a water-soluble dye having an active hydrogen, and
(b) an epoxy compound represented by the formula:

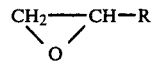

wherein R represents an alkyl group having 1 to 4 carbon atoms, or —$CH_2OR_1$ and $R_1$ represents hydrogen, an alkyl group having $C_1$ to $C_5$, an alkenyl group having $C_1$ to $C_5$, (meth)acryl acid group, propyltrimethoxysilane or a polyhydric alcohol moiety having molecular weight of not more than 300,
wherein said coloring agent has substantially no unreacted epoxy groups.

* * * * *